United States Patent Office 3,404,165
Patented Oct. 1, 1968

3,404,165
ACID SALTS OF ETHER DIAMINES
Walter M. Budde, Jr., Prior Lake, and Jack W. Sigan, Minneapolis, Minn., assignors to Ashland Oil & Refining Company, Ashland, Ky., a corporation of Kentucky
No Drawing. Continuation-in-part of application Ser. No. 438,090, Mar. 3, 1965. This application Jan. 10, 1966, Ser. No. 519,531
4 Claims. (Cl. 260—404.5)

ABSTRACT OF THE DISCLOSURE

Either diamines having the general formula

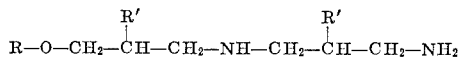

where R is an aliphatic group having 1 to 13 carbon atoms, and R' is selected from the group consisting of a hydrogen atom and a methyl group, and acid salts of said ether diamines, are used in corrosion inhibition, for example, in inhibiting the corrosion of various metal surfaces by corrosive fluids.

This invention relates to ether diamines and acid salts thereof. In another aspect, it relates to the preparation of ether diamines and acid salts thereof. In another aspect, it relates to the use of ether diamines and their acid salts in inhibiting or preventing the corrosion of metals which come into contact with corrosive fluids such as petroliferous fluids, well-working fluids, and secondary recovery fluids used in the production of oil or gas from subsurface geological formations.

This application is a continuation-in-part of our copending application, Ser. No. 438,090, filed Mar. 3, 1965, now abandoned.

The corrosion of metal surfaces, particularly ferrous metal surfaces, by corrosive fluids and the like is a serious problem in many industries. For example, in the oil and gas industry, the production of petroliferous fluids from subsurface geological formations is often accompanied by severe corrosion of metal apparatus in contact with well-working fluids such as brines, drilling fluids, packer fluids, water flooding fluids, acidizing fluids, and the like, as well as the produced petroliferous fluids. Such corrosion may be due to the presence of corrosive chemical substances naturally occurring in or introduced into the fluids, such as hydrogen sulfide, carbon dioxide (which forms carbonic acid) and/or due to the presence of living organisms such as sulfate-reducing bacteria (which produce hydrogen sulfide in their metabolical processes). Whatever the cause of the corrosion of metal surfaces in contact with such corrosive fluids, serious damage to such surfaces often occurs, including failure of equipment, such as production tubing or pipelines through which the fluids flow.

A host of different compounds or materials have been disclosed or used in the prior art as corrosion inhibitors for normally corrosive fluids in contact with metal surfaces. While many such materials have proven useful as corrosion inhibitors, their use entails problems of handling or dispersion, especially where they are solids, or they are quite expensive, or they must be used in large amounts or in combinations in order to obtain a satisfactory degree of corrosion inhibition.

Accordingly, an object of this invention is to provide novel ether diamines and acid salts thereof. Another object is to provide a method for preparing ether diamines and acid salts thereof. Another object is to provide an improved method for inhibiting the corrosion of metal surfaces, such as ferrous metal surfaces, in contact with corrosive fluids. Further objects and advantages of this invention will become apparent to those skilled in the art from the following description and appended claims.

Briefly, I have discovered in one aspect of this invention that the corrosion of metal surfaces, such as corrodible ferrous metals, in contact with normally corrosive materials can be eliminated, substantially reduced, or inhibited by contacting, e.g., immersing, such metal surfaces in or with a solution containing a corrosion-inhibiting amount of a N-aliphatic ether diamine or acid salt thereof. Such inhibitors can be added directly to the normally corrosive material which comes into contact with the metal surface, or can be dissolved in a liquid carrier, e.g., water, and the solution used to treat, e.g., wet or form a film on, the metal surface prior to its contact with the corrosive material, or both methods of corrosion control can be used.

The corrosion inhibiting ether diamine compounds of this invention can be represented by the general formula:

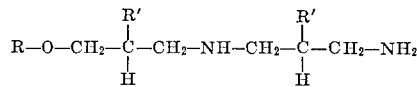

where R is a straight or branched chain aliphatic group, which can have 1 to 13 or more carbon atoms and preferably 7 to 13 carbon atoms, and R' is a hydrogen atom or a methyl group. R is preferably an alkyl group with 1 to 4 methyl branches, such as the alkyl groups derived from oxo alcohols, e.g., isooctyl alcohol, 3,4,4-trimethyl 1-hexanol, decyl alcohol, and tridecyl alcohol. Where R is an alkyl group, these compounds can be named as N-alkoxyalkyl alkylene diamines, e.g., where R is octyl and the two R' groups are hydrogen, the compound can be named N-γ-octoxypropyl-1,3-propylene diamine. These compounds, hereinafter occasionally referred to as ether diamines for purposes of brevity, can be used in their free base form or can be partially or completely neutralized with an acid and used in acid salt form. Since the ether diamines contain two amine nitrogens, i.e., they contain a primary amine group and a secondary amine group, each ether diamine can combine with one or two monovalent acid anions. So, in neutralizing the ether diamines with an acid having a monovalent anion, at least one to two moles of acid is used per mole of ether diamine. For example, where the diamine is to be completely neutralized with an acid having a monovalent acid anion, two moles of the acid will be used per mole of ether diamine and the resulting salt will have the general formula:

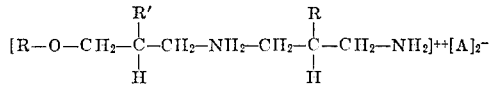

where R and R' are as defined above, and A is a solubilizing salt-forming monovalent acid anion, such as chloride, acetate, benzoate, etc. For some purposes, it may be desirable to use either less than one mole of acid or more than two moles of acid in neutralizing the diamine.

Inorganic or organic acids can be used in forming the salts from the free base ether diamines. Common inorganic acids which can be used include phosphoric, nitric, boric, hydrochloric, hydrobromic and sulfuric acids. Organic acids which can be used include aliphatic mono-, di-, or tricarboxylic acids; lower alkyl carboxylic acids; mono- or dihydroxy lower alkyl carboxylic acids and amino substituted compounds thereof; and unsaturated aliphatic acids. Examples of these organic acids include formic, acetic, hydroxy acetic, propionic, butyric, isovaleric, glycolic, lactic, gluconic, amino acetic, protonic, malonic, succinic, glutaric, adipic, malic, tartaric, glutanic, maleic, fumaric, citric, isocitric, aconitic, oxalic, salicylic, sulfonic, carbonic, benzoic, and naphthenic acids and the like. Particularly useful, commercially available acids which can be used include fatty acids, either saturated or unsaturated with 14 to 18 carbon atoms, such as those derived from naturally occurring fats and oils, such as soybean oil, coconut oil, tallow, tail oil, etc., as well as polymerized fatty acids such as dimer fatty acids (which are usually mixtures of dimer and trimer acids obtained by polymerizing linoleic acids, tall oil acids, or soybean acids). Another useful commercially available group of acids which can be used are the Sunaptic Acids, which are monocarboxylic derivatives of naphthalene hydrocarbons, having average molecular formulas $C_{19}H_{34}O_2$, $C_{21}H_{37}O_2$, and $C_{29}H_{49}O_2$.

Representative ether diamines which can be prepared and used in the practice of this invention include:

N-(methoxy-n-propyl)-1,3-propylene diamine;
N-(ethoxy-n-propyl)-1,3-propylene diamine;
N-(n-propoxy-n-propyl)-1,3-propylene diamine;
N-(isobutoxy-n-propyl)-1,3-propylene diamine;
N-(n-pentoxy-n-propyl)-1,3-propylene diamine;
N-(n-hexoxy-n-propyl)-1,3-propylene diamine;
N-(n-heptoxy-n-propyl)-1,3-propylene diamine;
N-(3,4-dimethylhexoxy-n-propyl)-1,3-(2-methyl)-propylene diamine;
N-(n-heptenoxy-2-methylpropyl)-1,3-propylene diamine;
N-(4-methyl-3-hexenoxy-n-propyl)-1,3-(3-methyl)-propylene diamine;
N-(n-octoxy-n-propyl)-1,3-propylene diamine;
N-(3,4-dimethylhexoxy-n-propyl)-1,3-(2-methyl)-propylene diamine;
N-(4-ethylhexenoxy-2-methylpropyl)-1,3-(2-methyl)-propylene diamine;
N-(1-methylheptoxy-n-propyl)-1,3-propylene diamine;
N-(4,4-dimethylhexoxy-n-propyl)-1,3-propylene diamine;
N-(6-methylheptoxy-n-propyl)-1,3-propylene diamine;
N-(7-octenoxy-n-propyl)-1,3-(2-methyl)-propylene diamine;
N-(3-methyl-5-heptenoxy-n-propyl)-1,3-propylene diamine;
N-(n-nonoxy-n-propyl)-1,3-propylene diamine;
N-(4-methyl-3-ethylhexoxy-n-propyl)-1,3-propylene diamine;
N-(2,3-dimethyl-4-heptenoxy-2-methylpropyl)-1,3-propylene diamine;
N-(n-decoxy-n-propyl)-1,3-propylene diamine;
N-(3,4,5-trimethylheptoxy-n-propyl)-1,3-(2-methyl)-propylene diamine;
N-(9-decenoxy-2-methylpropyl)-1,3-propylene diamine;
N-(9-methyl-4,5-nonadienoxy-n-propyl)-1,3-propylene diamine;
N-(n-hendecoxy-n-propyl)-1,3-propylene diamine;
N-(9-methyldecoxy-2-methylpropyl)-1,3-propylene diamine;
N-(9-hendecenoxy-n-propyl)-1,3-(2-methyl)-propylene diamine;
N-(3-n-propyloctoxy-n-propyl)-1,3-propylene diamine;
N-(n-dodecoxy-n-propyl)-1,3-propylene diamine;
N-(10-methylhendecoxy-2-methyl-propyl)-1,3-propylene diamine;
N-(8-methyl-6-ethylnonoxy-n-propyl)-1,3-(2-methyl)-propylene diamine;
N-(10-dodecenoxy-n-propyl)-1,3-propylene diamine;
N-(n-tridecoxy-n-propyl)-1,3-propylene diamine;
N-(4,7,9-trimethyldecoxy-n-propyl)-1,3-(2-methyl)-propylene diamine;
N-(3,5,7,8-tetramethylnonoxy-2-methylpropyl)-1,3-propylene diamine;
N-(10-tridecenoxy-n-propyl)-1,3-propylene diamine;
N-(4,8,12-trimethyl-11-decenoxy-n-propyl)-1,3,-propylene diamine;
N-(8-n-propyl-5,9-decadienoxy-2-methylpropyl)-1,3-propylene diamine;

and the like, and the acid salts thereof such as mentioned in the preceding paragraph. Mixtures of said ether diamines and mixtures of the acid salts thereof can be used, especially where the alcohol used to form the ether diamines is a mixture of alcohols, as will be the case where commercial oxo alcohols are used.

The ether diamines of this invention have properties which make them particularly suitable for use as corrosion inhibitors, as well as for many other applications. They are liquids and have extremely low cloud points, generally below 0° C. They have relatively high nitrogen or amine content, and low combining weight. They can be made from inexpensive, commercially available materials. In addition to their use as corrosion inhibitors, they can be used as bactericides, and they can be used as chemical intermediates. As pointed out above, they can be readily neutralized and used as acid salts for the same purposes. Many of these salts are soluble and stable in hard or soft water and brines even at high temperatures. Where aqueous solutions are desired as treated, we prefer to employ the water soluble ether diamine salts. Many of the ether diamines are miscible with a host of organic solvents, such as isopropanol, hexylene glycol, kerosene, benzene, xylene, mineral spirits, petroleum oil, lubricating oil, etc. Many of the ether diamines exhibit better water solubility and dispersibility in their salt form than fatty diamine salts derived from coco and tallow.

In the application of the ether diamines as corrosion inhibitors as well as for many other uses, they can be used in undiluted form per se or as, for example, 10 to 70 weight percent solutions or dispersions in water or in other polar and non-polar or organic solvents. When used in corrosion control, the amount of ether diamine or acid salt thereof which can be used can vary and will be dependent upon such factors as the type of liquid being used as carrier or being treated, the particular metal to be protected against corrosion, the particular ether diamine used, and the amount of corrosive matter in the normally corrosive fluid being treated or encountered. Stated functionally, the amount of ether diamine or salt thereof used will be a corrosion inhibiting amount or an amount sufficient to inhibit corrosion of the metal in contact with the normally corrosive material. Generally, satisfactory results will be obtained if the ether diamine or salt is used in an amount in the range of 0.01% to 5%, based on the weight of the liquid being treated or used as carrier. The optimum amount of inhibitor to be used can be readily determined by simple, routine tests known to those skilled in the art. It is also within the scope of this invention to use various other known corrosion inhibitors in conjunction or in admixture with the ether diamines of this invention, such as various quaternary ammonium salts, particularly aliphatic trialkyl ammonium halides where the aliphatic group is derived from a fatty acid, e.g., soya or tallow trimethyl ammonium chloride.

Broadly speaking, we can protect any metal surface from the corrosion of any fluid the metal comes into contact with, including water, water vapor, steam, brine, aqueous mineral acid solutions such as hydrochloric acid solutions used as cleaning agents or in acidizing geological formations penetrated by an oil or gas well, liquids used in secondary recovery and water flooding operations, aqueous drilling fluids, aqueous fracturing fluids, injection fluids squeezed into a formation to increase the flow or production of petroliferous fluids into a well, petroliferous fluids themselves such as crude oil and gas condensate, and the like. The ether diamines and salt of this invention are particularly useful as corrosion inhibitors for aqueous liquids containing such micro-organisms as sulfate-reducing bacteria (*Desulfovibrio desulfuricans*) and other bacteria which by reason of their metabolic process produce corrosive substances such as hydrogen sulfide.

The ether diamines of this invention can be prepared by reacting an aliphatic ether primary amine with acrylonitrile or methacrylonitrile and then hydrogenating the resulting aliphatic ether amine nitrile to produce the ether diamine. The aliphatic ether primary amines can themselves be prepared by hydrogenating the aliphatic ether nitriles produced by the reaction of a primary and/or secondary aliphatic alcohol with acrylonitrile or methacrylonitrile. Alcohols which can be used for this purpose include methanol, isobutanol, etc. and higher alcohols. Particularly useful alcohols which can be used are the higher oxo alcohols produced by hydrogenation of oxoaldehydes which in turn are prepared by the oxonation reaction between an olefin, carbon monoxide and hydrogen. Typically commercially produced higher oxo alcohols are very complex mixtures which are not separated into individual compounds, such as isooctyl alcohol (which is a mixture of 3,4-dimethyl-1-hexanol, 3,5-dimethyl-1-hexanol, 4,5-dimethyl-1-hexanol, 3-methyl-1-heptanol, and 5-methyl-1-heptanol); decyl alcohol which contains predominantly the isomeric trimethylnonanols. These latter three types of oxo alcohols are clear, colorless, slightly viscous liquids having a characteristic alcohol odor. Another commercially available aliphatic alcohol product which can be used is Eastman Alcohol 750, having a hydroxyl value of about 450 and comprising 2% of $C_4$ primary alcohol, 10% of $C_6$ primary alcohol, 48% of $C_7$ primary alcohol, 25% of $C_7$ secondary alcohol, and 15% of $C_8$ primary alcohol.

The preparation of the novel ether diamines of this invention from the aliphatic alcohols can be illustrated by the following reaction in which R and R' are as defined hereinbefore.

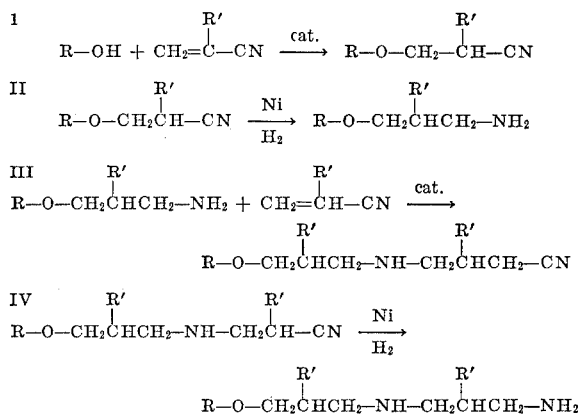

In preparing the aliphatic ether nitriles according to Reaction I above, the primary and/or secondary aliphatic alcohol and acrylonitrile (or methacrylonitrile) are reacted in stoichiometric amounts (preferably with 2 to 5 percent excess of the acrylonitrile) in the presence of a soluble alkaline catalyst such as a metal alcoholate, e.g., sodium methoxide, potassium methoxide, sodium ethoxide, potassium ethoxide, and the like, or oxides and hydroxides of those metals soluble in aliphatic alcohols such as sodium oxide, potassium oxide, sodium hydroxide and potassium hydroxide. The alcoholates may be introduced into the reaction mixture per se, or they may be formed in the reaction mixture in situ, the amount of catalyst being present in the amount of 0.005 to one percent of the total weight of the reactants. Generally, this reaction will be carried out at a temperature in the range of 30–100° C., using atmospheric or autogenous pressure. The resulting reaction mixture, containing the aliphatic ether nitrile, can be treated to recover this latter product for subsequent hydrogenation, though I prefer to directly hydrogenate the resulting reaction mixture. This hydrogenation reaction illustrated by Reaction II above, can be carried out, for example, at a temperature in the range of 70–175° C. and pressures in the range from autogenous pressure up to as much as 250 atmospheres in the presence of hydrogen (and 1 to 25 percent ammonia by weight of the reaction mixture) using such hydrogenation catalysts as nickel, copper, cobalt, palladium metal or oxide, platinum metal or oxide and chromium oxide, though the preferred catalyst is Raney nickel. Following completion of the hydrogenation reaction, low molecular weight volatile materials such as ammonia and water can be stripped from the reaction mixture, if desired, for example, under the vacuum of a water aspirator, to recover the aliphatic ether amine product. This latter product is then reacted with acylonitrile (or methacrylonitrile), preferably with 2 to 5 percent stoichiometric excess of the latter, as shown in Reaction III. This latter reaction is preferably carried out in the presence of a catalytic amount of an acid catalyst, e.g., 0.005 to one percent acetic acid, based on the total weight of reactants, at temperature and pressure conditions like that of Reaction I. The hydrogenation of the resulting aliphatic ether amine nitrile, Reaction IV, is then carried out in the manner of Reaction II and the resulting novel ether diamine recovered.

The following examples further illustrate the objects and advantages of this invention, though it should be understood that the various reactants and amounts thereof, reaction conditions, and other details are merely illustrative and should not be construed to unduly limit this invention.

Example I

N-tridecoxypropyl-1,3-propylene diamine was prepared from an oxo alcohol, viz., Enjay tridecyl alcohol, and acrylonitrile in the following manner. Four hundred g. of tridecyl alcohol was mixed in an autoclave with 0.4 g. of metallic sodium and reacted over a period of 1¼ hrs. with 112 g. of acrylonitrile at about 70° C. Three g. of methanol was used in this reaction to increase the reaction rate. Four hundred ninety-one g. of the reaction mixture, having an hydroxyl value of 13, was mixed with 1.04 g. of glacial acetic acid (to neutralize sodium derivatives), and 4.91 g. of Raney nickel. The reaction mixture was purged with hydrogen and the autoclave pressured to 80 p.s.i.g. with ammonia. The reaction mixture was heated at about 300° F. under 500 p.s.i.g. hydrogen pressure for about 1¼ hrs. and then cooled less than 80° F. Four hundred sixteen g. of the resulting reaction mixture was mixed with 4.2 g. of glacial acetic acid and 83 g. of acrylonitrile was slowly added over a 20 min. period, raising the temperature from 100° F. to 125° F. The mixture was then cooled to less than 100° F. and allowed to react over a 3-hr. period at 80–90° F. The reaction mixture, having 4.19% total amine nitrogen content, with the sum of secondary and tertiary amine nitrogen contents being 3.93%, was then pressured to 90 p.s.i.g. with ammonia at 80° F., and thereafter reacted at about 300° F. under a hydrogen pressure of 500 p.s.i.g. for about 6 hrs. The reaction mixture was then stripped to remove volatiles and mixed with 4.91 g. of Raney nickel. The mixture was then pressured to 80 p.s.i.g. with ammonia and thereafter further hydrogenated at about 300° F. under a hydrogen pressure of 500 p.s.i.g. for 5 more hours. The final liquid ether diamine reaction product had a total amine nitrogen content of 6.7%, with the sum of secondary and tertiary nitrogen contents being 3.02%.

Example II

N-isooctoxy-1,3-propylene diamine was prepared from an oxo alcohol, viz., Enjay isooctyl alcohol having a hydroxyl value of 421.7, and acrylonitrile in the following manner. Three hundred g. of isooctyl alcohol was charged to an autoclave with 0.3 g. of metallic sodium. Acrylonitrile was charged to the autoclave over a 30-min. period, the total amount of acrylonitrile charged being 128 g. The exothermic reaction raised the temperature of the mixture to 65–70° C., and after 1 hr. of reaction the mixture cooled to 35° C. and was treated with 2.61 g. of glacial acetic acid (to neutralize sodium derivatives). Four hundred g. of the resulting reaction mixture was then hydrogenated in the presence of 8 g. of Raney nickel for about 7 hrs. at a hydrogen pressure of 500 p.s.i.g. and at about 300° F. The resulting reaction product, having a total amine nitrogen content of 5.9%, was then reacted with 94 g. of acrylonitrile over about a 4-hr. period, producing a reaction product mixture having a total amine nitrogen content of 4.78%, the sum of secondary and tertiary amine nitrogen contents being 4.6%. The autoclave containing the reaction mixture was then purged with hydrogen, pressured to 80 p.s.i.g. with ammonia, and then heated to about 300° F. under 550 p.s.i.g. hydrogen pressure over a period of about 2 hrs. The final cooled liquid reaction ether diamine product had a total amine nitrogen content of 8.28%, the sum of the secondary and tertiary amine contents being 4.42%, with a Gardner color of 4+.

Example III

An ether diamine was prepared from Eastman Alcohol 750 (having an hydroxyl value of about 450) and acrylonitrile in the following manner. Five hundred g. of the alcohol was mixed with 1 g. of metallic sodium and heated for 2½ hrs. at a temperature of 30–48° C. with 228 g. of acrylonitrile, after which the reaction product mixture was allowed to stand overnight. The following day, the reaction mixture was heated and allowed to react for 4½ hrs. at a temperature of 77–80° C. Seven hundred seven g. of the reaction product mixture, having an hydroxy value of 63.7, was then mixed with 2.61 g. of glacial acetic acid and 14.2 g. of Raney nickel. After purging the reaction mixture with hydrogen and pressurizing it to 80 p.s.i.g. with ammonia, the reaction mixture was hydrogenated at about 300° F. for 2½ hrs. under a hydrogen pressure of 500 p.s.i.g. The reaction mixture was put under a water aspirator vacuum to remove volatiles and then mixed with 7 g. of glacial acetic acid. Thereafter, the reaction mixture was heated at about 145° F. for 2 hrs. with 183 g. of acrylonitrile, producing a product having a total amine nitrogen content of 5.06%, with the sum of secondary and tertiary amine nitrogen contents being 4.7%. The reaction mixture was then purged with hydrogen and pressured with ammonia to 80 p.s.i.g., and then hydrogenated at about 300° F. for 3 hrs. under a hydrogen pressure of 500 p.s.i.g. The final liquid ether diamine reaction product had a total amine nitrogen content of 7.80%, with the sum of second and tertiary amine nitrogen contents being 3.23%.

Example IV

In this example, the corrosion inhibiting properties of three different ether amine salts of this invention were evaluated by immersing a 10–20 steel coupon in an aqueous solution containing the ether diamine salts and thereafter exposing the coupon to a corrosive gas well condensate containing 26 p.p.m. $CO_2$, after which the degree of corrosion protection by the ether diamine was determined.

The three ether diamines used are set forth in Table I.

TABLE I

| Ether diamine [1] | Equivalent weight | Total amine value | Gardner color | Cloud point, °C. |
|---|---|---|---|---|
| (A) N-tridecoxypropyl-1,3-propylene diamine. | 206 | 272 | 5 | Below 0. |
| (B) N-isooctoxypropyl-1,3-propylene diamine. | 169 | 331 | 7 | Do. |
| (C) Ether diamine prepared from Eastman Alcohol 750 and acrylonitrile | 312 | 312 | 6 | Do. |

[1] Ether diamines A, B, and C are those prepared according to Examples I, II and III, respectively.

One part by weight of each of these ether diamines was neutralized with two parts by weight of dimer-trimer fatty acids to form the corresponding acid salts. Each of these salts was mixed in varying amounts with a solution comprising 160 ml. of brine and 28 ml. of petroleum oil. In each run, the steel coupon was immersed in the brine-oil containing the inhibitor salt for 2 hrs., after which the wet coupon was withdrawn and immersed in the corrosive gas condensate for 24 hrs. at 175° F. The degree of corrosion of the so-treated coupon was then determined by determining the loss in weight of the coupon, from which the degree of corrosion protection imparted by the corrosion inhibitor salt was determined. For purposes of this determination, a control run was made in which a steel coupon was immersed in the brine-oil containing no inhibitor and then immersed in the gas condensate. The weight loss of this control coupon was determined. The percent protection (or inhibition) offered by the inhibitor salt was determined by subtracting the loss in weight of the corrosion-protected coupon from the loss in weight of the unprotected or control coupon, dividing the remainder or difference by the loss in weight of the unprotected or control coupon and multiplying the dividend by 100. The results obtained are summarized in Table II, which show almost complete protection (i.e., 97–99%) against corrosion.

TABLE II

| Run | Ether diamine used [1] | Conc. of corrosion inhibitor in brine oil, p.p.m. | Degree of corrosion protection, percent |
|---|---|---|---|
| 1 | A | 5,000 | 99 |
| 2 | A | 10,000 | 99 |
| 3 | A | 50,000 | 99 |
| 4 | A | 100,000 | 99 |
| 5 | B | 5,000 | 97 |
| 6 | B | 10,000 | 98 |
| 7 | B | 50,000 | 98 |
| 8 | B | 100,000 | 99 |
| 9 | C | 5,000 | 99 |
| 10 | C | 10,000 | 99 |
| 11 | C | 50,000 | 99 |
| 12 | C | 100,000 | 99 |

[1] Ether diamines A, B and C are described in Table I.

Example V

Broth cultures containing bacteria-contaminated soils indigenous to the "four corners area" were serially diluted with water and each broth solution was treated with 10 p.p.m. of the ether diamine salts of Example IV. The treated cultures were examined after 1 hr. to determine the presence or absence of bacteria growth. As those skilled in the art will appreciate, said bacteria from said locality are extremely difficult to kill and fluids containing said bacteria will normally cause severe corrosion of metal surfaces in contact with such fluids. Results are summarized in Table III, showing complete kill of bacteria at certain dilution or inhibitor levels.

TABLE III

| Run | Ether diamine used [1] | Observed bacteria growth [3] | | | | |
|---|---|---|---|---|---|---|
| | | Initial broth | 10-fold dilution [2] | 100-fold dilution | 1,000-fold dilution | 10,000-fold dilution |
| 1 | None (control). | + | + | + | + | + |
| 2 | A | + | + | None | None | None |
| 3 | B | + | + | + | None | None |
| 4 | C | + | + | + | None | None |

[1] See Example IV for specific salts of ether diamines A, B, and C.
[2] "10-fold dilution" means one part of the initial broth was diluted with ten parts of water.
[3] "+" indicates growth of bacteria, and "none" indicates no growth of bacteria.

Example VI

In this example, aqueous hydrochloric acid solutions were treated with varying concentrations of a corrosion inhibitor containing equal amounts, by weight, of N-isooctylpropyl-1,3-propylene diamine, soya trimethyl ammonia chloride and propargyl alcohol. Various types of steel coupons were immersed in the treated hydrochloric acid solutions, heated to 210° F. and stirred for 24 hrs., and then examined to determine the degree of protection against corrosion imparted to the acid solutions by the corrosion inhibitor combination, the degree of protection being determined according to the procedure of Example IV. Results are summarized in Table IV, showing the extremely high degree of corrosion prevention obtained.

TABLE IV

| Run | Type of steel coupon used | Conc. of inhibitor combination in HCl solu., wt. percent | Degree of corrosion protection, percent | |
|---|---|---|---|---|
| | | | In 7% HCl | In 15% HCl |
| 1 | Mild steel (1020) | 0.07 | 99.6 | 97.6 |
| 2 | do | 0.13 | 99.8 | 98.6 |
| 3 | Stainless steel (304) | 0.07 | 99.9 | 99.9 |
| 4 | do | 0.13 | 99.9 | 99.2 |

Example VII

In this example, the corrosion inhibiting properties of several ether diamine acid salts (at 25 p.p.m.) were determined according to the "Laboratory Flowing Test for Evaluation of Oil Well Corrosion Inhibitors" described in "Corrosion," v. 18, No. 8, August 1962. Results are set forth in Table V, showing the high degree of corrosion inhibition obtained.

TABLE V

| Run | Inhibitor used | Degree of corrosion protection, percent |
|---|---|---|
| 1 | Hydroxy acetate of ether diamine A | 94.3 |
| 2 | Hydroxy acetate of ether diamine B | 95.1 |
| 3 | Hydroxy acetate of ether diamine C | 93.8 |
| 4 | Sunaptic acid salt of ether diamine A | 97.2 |
| 5 | Sunaptic acid salt of ether diamine B | 96.1 |
| 6 | Sunaptic acid salt of ether diamine C | 93.1 |
| 7 | Benzoic acid salt of ether diamine A | 73.1 |
| 8 | Benzoic acid salt of ether diamine B | 82.1 |
| 9 | Benzoic acid salt of ether diamine C | 75.6 |

See Table I for ether diamines A, B and C.

Example VIII

N-isobutoxypropyl-1,3-propylene diamine was prepared from isobutyl alcohol and acrylonitrile in the following manner. Three hundred-seventy g. of isobutyl alcohol was mixed with 0.4 g. of metallic sodium and reacted over a period of 3¼ hrs. with 278 g. of acrylonitrile at about 70° C. Infra red analysis of the resulting product revealed substantially complete reaction of the isobutanol. One g. of glacial acetic acid was added to the product to neutralize the catalyst, and the product was then filtered. Six hundred-eight g. of the filtered product was mixed with 12.2 g. of Raney nickel in an autoclave, which was pressured to 100 p.s.i.g. with ammonia. The reaction mixture was then heated to about 300° F. under 500 p.s.i.g. hydrogen pressure for ¾ hr. and then cooled to less than 100° F. The reaction mixture was then put under vacuum at 150° F. to strip unreacted acrylonitrile and ammonia. Glacial acetic acid (1.22 g.) and then 242 g. of acrylonitrile were then added to the reaction mixture, the acrylonitrile being added over a period of 50 min., raising the temperature from 80° F. to 150° F. The reaction mixture was then allowed to react for about 2 hrs. at 100–140° F. The reaction mixture, having 6.94% total amine nitrogen content, with the sum of secondary and tertiary amine nitrogen contents being 6.80%, was then pressured to 100 p.s.i.g. with ammonia at 150° F., and thereafter reacted at about 300° F. under a hydrogen pressure of 500 p.s.i.g. for about 1 hr. The final liquid ether diamine reaction product had a total amine nitrogen content of 13.1%, with the sum of secondary and tertiary nitrogen contents being 6.09%. This ether diamine was dispersible or slightly soluble in water. The ether diamine di-acetate salt was completely soluble in water.

Various modifications and alterations of this invention will become apparent to those skilled in the art from the foregoing description without departing from the scope and spirit of this invention, and it should be understood that the preferred embodiments of this invention illustrated herein should not be construed to unduly limit this invention.

We claim:

1. Acid salt of an ether diamine having the general formula $$R-O-CH_2-\overset{R'}{\underset{|}{C}}H-CH_2-NH-CH_2-\overset{R'}{\underset{|}{C}}H-CH_2-NH_2$$

where R is an alkyl or alkenyl group having 1–13 carbon atoms, and R' is a hydrogen atom or methyl group, said acid being selected from the group consisting of phosphoric acid, nitric acid, boric acid, hydrochloric acid, hydrobromic acid, sulfuric acid, sulfonic acid, lower alkyl carboxylic acids, and amino or hydroxyl-substituted compounds thereof, fatty carboxylic acids of 14–18 carbon atoms and dimer and trimer acids thereof, naphthenic carboxylic acids, and benzoic acid.

2. Acid salt of claim 1 wherein R has 7–13 carbon atoms.

3. Acid salt of claim 1 wherein R has 1–13 carbon atoms and is an alkyl group with 1–4 methyl branches.

4. Acid salt of claim 3 where R is isooctyl, isodecyl or isobutyl, and said acid is a fatty carboxylic acid, an acetic acid, a naphthenic carboxylic acid or benzoic acid.

References Cited

UNITED STATES PATENTS 2,523,177  9/1950  Yowell et al. _____ 260—584

OTHER REFERENCES

Tarbell et al.: The Journal of the American Chemical Society, vol. 72, pp. 2657–2661 (1950), QD1A5.

Kost et al.: Chemical Abstracts, vol. 48, pp. 2569–2570g (1954), QD1A51.

CHARLES B. PARKER, *Primary Examiner.*

R. L. RAYMOND, *Assistant Examiner.*